June 24, 1924.  
W. C. PLUNKETT  
TWO-PIECE GEAR  
Filed May 2, 1923

1,498,809

Inventor  
W. C. Plunkett.

Patented June 24, 1924.

1,498,809

UNITED STATES PATENT OFFICE.

WILLIAM CLARENCE PLUNKETT, OF BURT, NORTH DAKOTA.

TWO-PIECE GEAR.

Application filed May 2, 1923. Serial No. 636,167.

*To all whom it may concern:*

Be it known that I, WILLIAM C. PLUNKETT, a citizen of the United States, residing at Burt, in the county of Hettinger and State of North Dakota, have invented certain new and useful Improvements in Two-Piece Gears, of which the following is a specification.

This invention relates to an improved two-piece gear and seeks to provide a gear incorporating a gear ring which may be readily attached to or detached from the body of the gear so that should the teeth of the gear become worn or broken, the gear may be renewed by replacing the gear ring.

Other and incidental objects will appear hereinafter.

Figure 1:
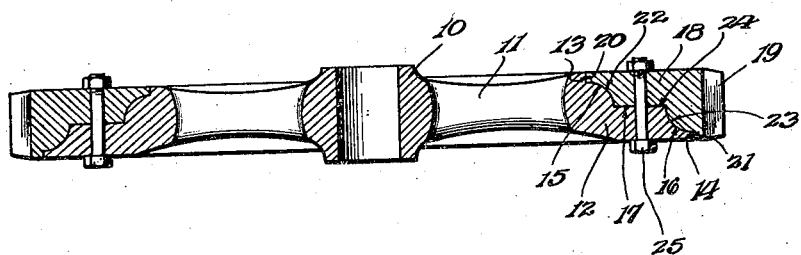
Figure 1 is a transverse sectional view through my improved gear.
Figure 2:
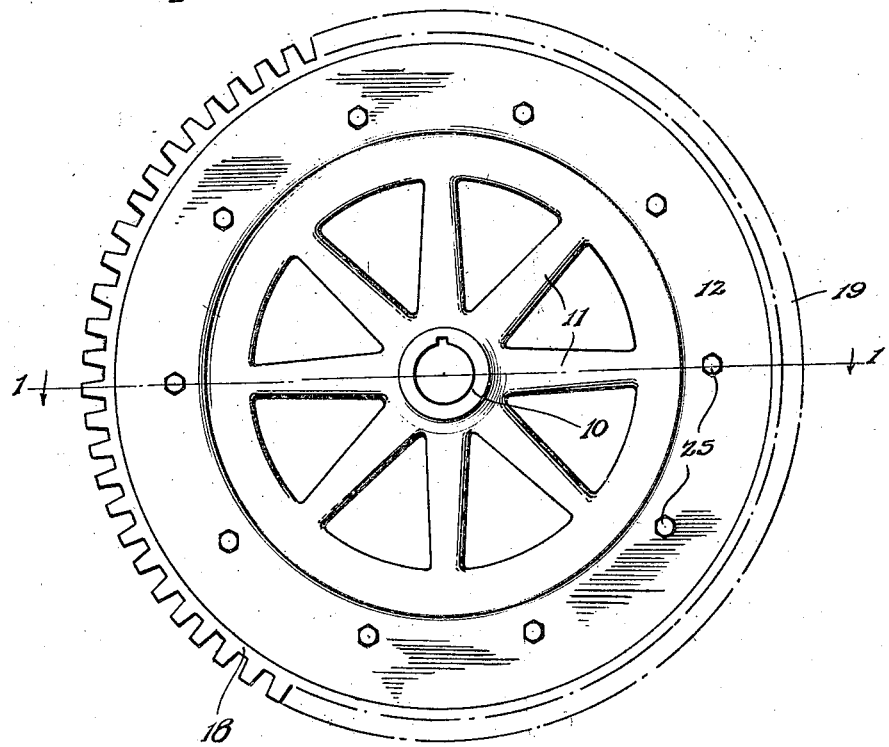
Figure 2 is a side elevation of the gear.

In carrying the invention into effect, I employ a gear body including a hub 10 and radiating from the hub are spokes 11 surrounded by a rim 12, the hub and spokes being preferably formed as an integral structure. As brought out in Figure 1, the rim is formed at its opposite side faces with concentric annular shoulders 13 and 14 lying at substantially right angles to the plane of the rim and the shoulder 13 is disposed near the inner edge of the rim while the shoulder 14 is disposed at the outer edge thereof. At the base of the shoulder 13 the rim is further provided with an annular convex rib 15 while at the base of the shoulder 14 is formed a concentric annular concave seat 16 and extending between the inner terminus of the rib and the inner terminus of said seat is a flat face 17 lying parallel to the flat side faces of the rim midway therebetween.

Surrounding the rim 12 of the gear body is a gear ring 18 on which are formed gear teeth 19. As will be observed, the gear ring is formed to mate with the rim seating flat thereagainst and is provided with shoulders 20 and 21 abutting the shoulders 13 and 14 of the rim. At the base of the shoulder 20 is a concave seat 22 accommodating the rib 15 while at the base of the shoulder 21 is a convex rib 23 fitting the seat 16 and extending between the seat 22 and rib 23 is a flat face 24 abutting the flat face 17. Detachably connecting the gear ring with the rim is a plurality of circumferentially spaced bolts 25 extending medially through the flat faces 17 and 24 of the rim and the gear ring. Thus, these bolts will firmly bind the gear ring upon the rim while the shoulders of the ring will coact with the shoulders of the rim for rigidly sustaining the ring. At the same time, by removing the bolts, the gear ring may be quickly detached so that should the ring become injured, said ring may be readily renewed without the necessity for removing the gear from its shaft.

Having thus described the invention, what is claimed as new is:

A gear including a gear body having a rim provided at one side thereof with a convex annular rib and a stepped surrounding concave annular seat separated from the rib by a medial flat face parallel to the side faces of the rim, the convex and concave faces of said rib and seat being tilted to face outwardly radially of the rim, a gear ring surrounding the rim lying flush with the side faces thereof and provided at one side with a concave annular seat accommodating said rib and a stepped surrounding concentric convex annular rib fitting in the seat of the rim and separated from the seat of the ring by a flat face extending parallel to the side faces of the ring to abut the flat face of the rim, and a plurality of bolts extending transversely through the rim and ring at the abutting flat faces thereof connecting the ring with the rim.

In testimony whereof I affix my signature.

WILLIAM CLARENCE PLUNKETT. [L. S.]